(12) United States Patent
De Haan et al.

(10) Patent No.: US 6,411,341 B1
(45) Date of Patent: Jun. 25, 2002

(54) ADAPTIVE PICTURE DELAY

(75) Inventors: Gerard De Haan; Paul W. A. C. Bienzen; Olukayode A. Ojo, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/924,866

(22) Filed: Sep. 5, 1997

(30) Foreign Application Priority Data

Sep. 11, 1996 (EP) .............................. 96202532

(51) Int. Cl.[7] .............. H04N 9/64; H04N 7/01; H04N 11/20

(52) U.S. Cl. ............. 348/714; 348/416; 348/911; 348/452

(58) Field of Search ............. 348/714, 715, 348/415, 416, 452, 700, 400, 401, 96, 97, 699, 911; 382/236

(56) References Cited

U.S. PATENT DOCUMENTS

| | | | | |
|---|---|---|---|---|
| 5,365,280 A | * | 11/1994 | De Haan et al. | |
| 5,381,183 A | * | 1/1995 | Ishizuka et al. | ............ 348/441 |
| 5,495,300 A | * | 2/1996 | De Haan et al. | |
| 5,532,750 A | * | 7/1996 | De Haan et al. | |
| 5,534,946 A | * | 7/1996 | De Haan et al. | |
| 5,757,435 A | * | 5/1998 | Wells | ............ 348/441 |
| 5,764,293 A | * | 6/1998 | Uz et al. | ............ 348/419 |

FOREIGN PATENT DOCUMENTS

| | | | | |
|---|---|---|---|---|
| EP | 0475499 B1 | * | 3/1992 | |
| EP | 0 514 012 A2 | * | 4/1992 | ............ H04N/7/01 |
| EP | 0514012 A2 | * | 11/1992 | |
| EP | 0601655 A1 | * | 6/1994 | |
| EP | 0 772 351 A1 | * | 11/1995 | ............ H04N/5/44 |

* cited by examiner

Primary Examiner—Nathan Flynn
Assistant Examiner—Virek Srivastava
(74) Attorney, Agent, or Firm—Edward W. Goodman

(57) ABSTRACT

Image information is stored into a memory device ($FM_{ORG}$) which is controlled in such a manner that only image information from a movement phase different from the movement phase of the image information already stored in the memory device ($FM_{ORG}$), is stored into the memory device ($FM_{ORG}$), whereby the memory device ($FM_{ORG}$) provides image information from a movement phase which differs from a movement phase of the image information by a fixed number of movement phases, even when the image information contains repeated movement phases.

10 Claims, 3 Drawing Sheets

$N^m : F_{out}(\underline{x},t) = [\overrightarrow{M/16 * F_u(\underline{x},t-T)} + \overrightarrow{(1-M/16)*F_u(\underline{x},t)}]/2$

ADAPTIVE PICTURE DELAY

BACKGROUND OF THE INVENTION

FIELD OF THE INVENTION

The invention relates to an adaptive picture delay for use in motion-compensated processing operations, like a motion vector estimation, motion vector compensated interpolation or a motion-compensated noise reduction.

DESCRIPTION OF THE RELATED ART

European Pat. Application No. EP-A-0,514,012, corresponding to U.S. Pat. 5,428,399, discloses a method and apparatus for a standard conversion of an image signal. Images may be stored on film or on one of the TV/video standards. Movie film comprises a sequence of frames at a 24 Hz rate, each film frame representing a certain movement phase. Video, however, comprises a sequence of interlaced fields at a 50 Hz or 60 Hz rate, each field representing a certain movement phase. Due to these inherent differences, when converting from film to one of the TV standards, or between the TV standards when at least part of the image originates from film, distortions are introduced, particularly when there are any objects moving in the image.

Images recorded on film are stored at 24 frames per second. Such images, if replayed at a slightly higher rate, namely, 25 frames per second, can readily be used for the PAL standard which uses 50 interlaced fields per second, whereby each film frame is repeated to form two video fields.

The conversion process is more complicated when the images are initially stored on film at a frame rate of 24 frames per second and it is desired to convert these images to the NTSC standard at 60 interlaced fields per second, because of the non-integral relationship of 60 to 24. In general, 5 video fields are made from 2 film frames by taking 3 consecutive video fields from 1 film frame, and 2 consecutive video fields from the next film frame. This is usually known as 3-2 pull-down conversion.

So as to accommodate for moving objects, a motion vector estimator provides motion vectors which are indicative of any objects moving and are used to manipulate the standards converter. The greatest errors have been encountered when transferring images previously subjected to a 3-2 pull-down conversion to obtain an NTSC signal, to the PAL standard. To cope with this problem, European Patent Application EP-A-0,514,012 discloses a technique in which each field of the output video signal has contributions from 4 input fields. Since the motion estimator can detect the phase of the 3-2 pull-down conversion, the correct input fields contribute to each output field. In a preferred embodiment of the prior art, 4 field stores are used. Alternatively, there may be only 2 field memories which is actually simpler to implement, but the conversion does not have the same performance of brightness changes and vector inaccuracies. An optimum compromise between the standards converter becoming too complex and adequate resolution on translating images, has been found when there are 4 fields stored at any one time in the standards converter.

SUMMARY OF THE INVENTION

It is, inter alia, an object of the invention to provide a memory control which enables a reduction in required memory capacity without a visible reduction in quality. To this end, a first aspect of the invention provides an image information storing method. A second aspect of the invention provides an image information storing arrangement incorporating the method. A third aspect of the invention provides an image processing apparatus comprising such an image information storing arrangement.

In accordance with the present invention, image information is stored into a memory device which is controlled in such a manner that only image information from a movement phase different from the movement phase of the image information already stored in the memory device, is stored into the memory device, whereby the memory device provides image information from a movement phase which differs from a movement phase of the image information by a fixed number of movement phases, even when the image information contains repeated movement phases, e.g., when the image information originates from movie film. The invention is preferably applied in an image processing apparatus, like a television set, a digital video disk (DVD) player, or a PC equipped for processing images.

These and other aspects of the invention will be apparent from and elucidated with reference to the embodiments described hereinafter.

DESCRIPTION OF THE PREFERRED EMBODIMENTS

Figure 1A:
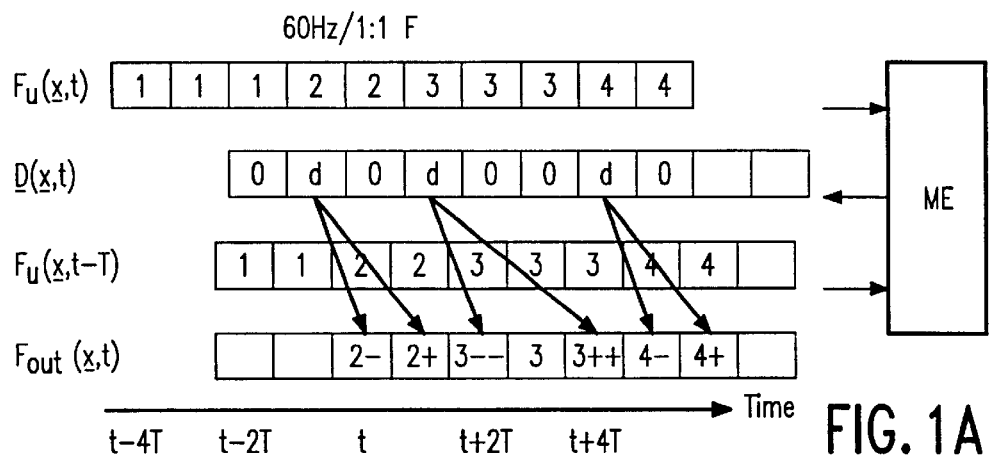
FIGS. 1A–1C illustrate field memory control adapted to input material, shown for 60 Hz movie film and video camera material.

In video signals, new fields do not necessarily bring new motion information, as sometimes, e.g., with (movie) film originated picture material, single pictures are transmitted during more than one field. It is an object of the present invention to continuously provide the information from two successive pictures to either a motion estimator or a compensation device, or a combined architecture for the two, with a single field or frame memory.

Picture sources exist with different picture rates. Common values for the picture rate are e.g., 16, 24, 25, 30, 50, 60 pictures/second. A usual method to show pictures from a "low update rate source" on a (television, or display) system with a higher picture frequency, is to repeat pictures until a new one is available (at its nominal rate). For example, in a 50 Hz TV broadcasting system, film pictures (24 Hz approximated by 25 Hz) are transmitted by showing every picture twice (disregarding interlace for clarity). Similarly, in a 60 Hz TV-broadcasting, film pictures (24 Hz) are transmitted by showing pictures alternatingly two or three times (again, disregarding interlace for clarity again). In case of a flicker-free (e.g., 100 Hz) display, the same pictures will be repeated even more often. A motion estimator, processing pictures at either the transmission or the display system rate, will receives the information from one picture more than once, and can only correctly estimate the velocity of objects in the current field if it has simultaneously access to a field from another "movement phase", i.e., the nearest previous or next different picture. Similarly, a field rate conversion algorithm sometimes (not necessarily, see e.g., European Patent Application EP-B-0,475,499) requires access to two neighboring movement phases. It is an object of the present invention to continuously provide the information from two neighboring movement phases to either a motion estimator or a compensation device, or a combined architecture for the two, with a single field or frame memory.

In a motion estimator or in a motion compensated interpolator, or in a combined architecture for motion estimation and compensation, information from two successive "motion phases", i.e., from two different original pictures, has to be simultaneously available. In a preferred embodiment of the current invention, this is realized with a single delay element with a capacity of one field or frame, the effective delay of which is adapted depending on the signal source. This can e.g., be realized by only writing a field or a frame into the delay element (memory) if a new picture ("movement phase") is transmitted. During the repeatedly transmitted pictures, the information in the delay memory is also repeatedly read and not overwritten. An alternative is that the memory is always writing information, and a multiplexer is used to switch either the incoming field or the (recirculated) previously stored field to the memory input.

There are two advantages of the proposed method over a method applying a (number of) fixed delay(s):

1) Motion can be estimated during every incoming picture, and not only if a new motion phase is sent (see e.g., U.S. Pat. No. 5,495,300). In case of a temporally recursive estimator, this implies more iterations on a movement phase and therefore a higher accuracy.

2) The memory capacity consists of one field or frame only which would be higher with a fixed delay.

For the estimator active on video from film material, the proposed method is an (advantageous) alterative for the circulating vector prediction memory as described in U.S. Pat. No. 5,495,300. The advantage here lies in the fact that the estimator can now estimate during every field period, which is twice as often as results in U.S. Pat No. 5,495,300. The advantage is larger in a 60 Hz system with 3-2 pull-down film and without field rate doubling. This situation is illustrated in FIG. 1. The invention is preferably applied in a combined architecture for motion estimation and up-conversion which performs an interlaced-to-progressive-scan conversion according to International Pat. Application WO-A-95/27,362, corresponding to U.S. Pat. 5,532,750 an 100 Hz up-conversion according to European Pat. Application EP-A-0,577,165, corresponding to U.S. Pat. No. 5,534, 946 and a 3-D noise reduction according to European Pat. Application EP-A-0,601,655, corresponding, in part, to U.S. Pat. No. 5,715,335. The frame memory is the one of which the control (write enable) is adapted to the input material.

Figure 1B:
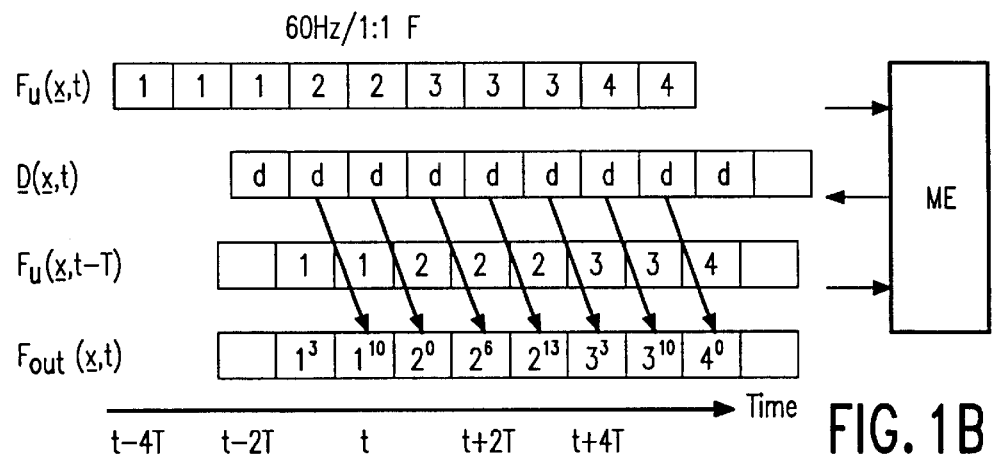
Figure 1C:
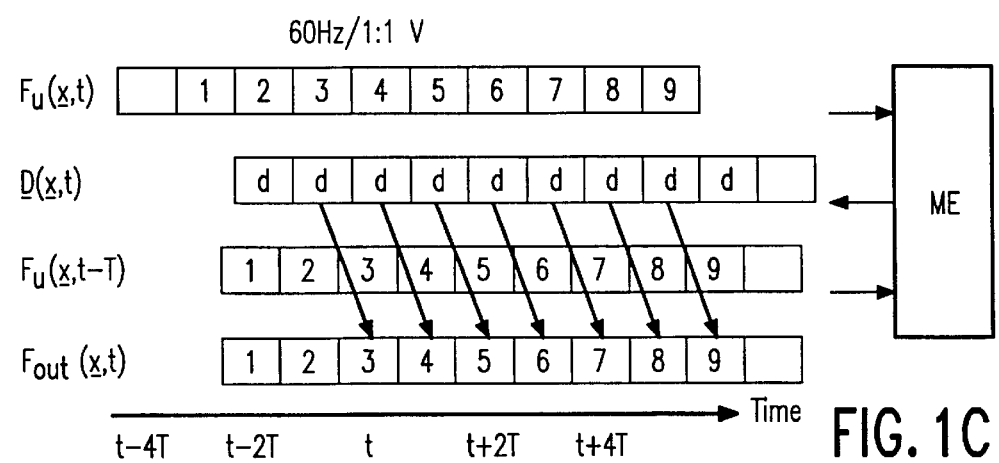

FIGS. 1A–1C illustrate a field memory control adapted to input material, shown for 60 Hz film and video-camera material. FIG. 1A shows the prior art fixed field memory control as described in U.S. Pat. No. 5,495,300. The line $F_u(x, t)$ shows the incoming 60 Hz non-interlaced (1:1) fields originating from movie film (F); the numbers in the boxes indicate the movie film frames from which the video fields have been derived by means of the 3-2 pull-down technique. The line $F_2(x, t-T)$ shows the incoming fields after a delay over one frame period T. The signals $F_u(x, t)$ and $F_u(x, t-T)$ are applied to a motion vector estimator ME which derives motion vectors $D(x, t)$: for some fields, zero vectors are obtained due to a lack of motion between two video fields originating from the same film image, while for other fields, non-zero vectors d are obtained. The zero motion vectors are obtained when $F_u(x, t)$ and $Fu(x, t-T)$ represent the same movie film image, while the non-zero motion vectors are obtained when $F_u(x, t)$ and $F_u(x, t-T)$ represent different movie film images. The line $F_{out}(x, t)$ shows motion-compensated output fields.

FIG. 1B illustrates an adaptive delay control in accordance with the present invention. As in FIG. 1A, the line $F_u(x, t)$ shows the incoming 60 Hz non-interlaced (1:1) fields originating from movie film (F); the numbers in the boxes indicate the movie film frames from which the video fields have been derived by means of the 3-2 pull-down technique. In accordance with the present invention, the line $F_u(x, t-T)$ shows the incoming fields after a delay which has been controlled such that $F_u(x, t)$ and $F_u(x, t-T)$ always represent different movie film images. Consequently, zero motion vectors are no longer obtained, see line $D(x, t)$ in FIG. 1B. The line $F_{out}(x, t)$ shows motion-compensated output fields which have been obtained in accordance with the formula shown at the bottom of FIG. 1B.

FIG. 1C illustrates what happens if 60 Hz non-interlaced video pictures (60 Hz/1:1 V) are received. The adaptive delay now constantly delays over one field period.

Figure 2:
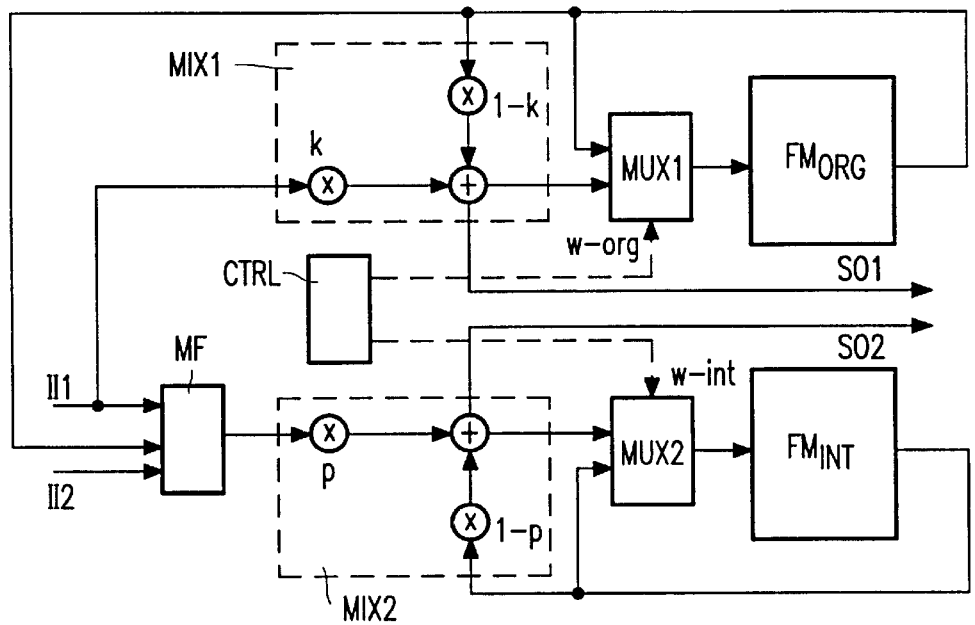
FIG. 2 illustrates a first embodiment of a memory arrangement in accordance with the present invention.

FIG. 2 illustrates a first embodiment of a memory arrangement in accordance with the present invention. Input line Il1 and a line-delayed input line Il2 of an interlaced input signal, and an output signal of a field memory $FM_{ORG}$, are applied to a median filter MF to obtain an interpolated line at a position vertically between the lines Il1 and Il2. The input lines Il1 are also applied to a mixer MIX1 whose output signal is applied to a field memory $FM_{ORG}$ thru a multiplexer MUX1. The multiplexer MUX1 is controlled by a control signal w_org from the control unit CTRL so as to switch the field memory $FM_{ORG}$ between receiving its own output signal or receiving the output signal of the mixer MIX1. A memory which is not implemented by means of a FIFO will not need such a multiplexer MUX1; the signal w_org is then applied to a write-enable input of the memory. An output signal of the median filter MF is applied to a mixer MIX2 whose output signal is applied to a field memory $FM_{INT}$ thru a multiplexer MUX2. The multiplexer MUX2 is controlled by a control signal w_int from a control unit CTRL so as to switch the field memory $FM_{INT}$ between receiving its own output signal or receiving the output signal of the mixer MIX2. The mixer MIX1 furnishes the odd lines SO1, while the mixer MIX2 furnishes the even lines SO2 of the sequential output signal of the memory arrangement of FIG. 2. Table 1 below, shows a field memory control corresponding to the embodiment of FIG. 2. The control signals w_org and w_int are set to 1 upon receipt of a new movement phase, as shown at input fields B, C, D and E. The temporal unit is one field period. Note that the content of the second field memory, $FM_{INT}$, is always a vertically interpolated version of the original picture, which is contained in the field memory $FM_{ORG}$. Preferably, the signals applied to the field memories $FM_{ORG}$ and $FM_{INT}$ are compressed before storage, so that a single field memory device suffices for both signals.

In a simpler embodiment, the input signal is applied to a first input of the multiplexer MUX1, whose output is coupled to its second input thru the field memory $FM_{ORG}$, where the multiplexer MUX1 is controlled by the signal w_org from the control unit CTRL as described above. As illustrated in the lines INPUT and $FM_{ORG}$ in Table 1, it holds that the movement phase of the output signal of the field memory $FM_{ORG}$ differs from the movement phase of the input signal by a fixed number of movement phases, although the input signal contains repeated movement phases.

A basic aspect of the present invention thus provides a delay element applied in a motion estimator, or in a motion compensated interpolator, or in a combined architecture for motion estimation and compensation, to supply information from a previous picture next to a more recent one, characterized in that delay caused by the delay element is adapted to the picture source, by a control signal, in such a manner that the delayed picture and the undelayed picture contain information from two different (e.g., successive) "movement phases". Preferably, the control signal is calculated from the "film signalling bit" as available in some television standards (PALplus, MPEG). The film signalling bit indicates the presence of repeated movement phases. Advantageously, the control signal is calculated from the motion vector field as calculated with a motion estimator, e.g. the estimator to which the adaptive picture delay element is connected, as disclosed in U.S. Pat. No. 5,365,280, incorporated by reference herein.

Much similar to what has been disclosed in U.S. Pat. No. 5,365,280, it is possible to initially fix the delay to one field period, to use the vector field to discriminate between various possible modes (video, film, phase 1, phase 2, etc.). If the sequence is recognized, the appropriate control of the adaptive picture delay is selected. In case of poor temporal consistency of the motion vectors, the initialization phase is returned to. Alternatively, the picture can be divided into various areas, whereafter, for every area, one of the possible control modes of the delay element is chosen. Eventually, (for the entire picture) that control mode is chosen that yields the highest temporal consistency of the resulting motion vector field. Again, return to initialization (different control of various areas) in case of poor temporal consistency of motion vectors.

In the specific case of film-originated video picture material, information from a single picture is transmitted in more than one field. Though possibly stationary in time, two successive fields contain both interlace phases. For the purposes of motion estimation and compensation, a knowledge of this situation can be used to realize a perfect sequential scan conversion, an improved motion estimation and a high quality motion portrayal improvement. It is an object of a further aspect of this invention to present, within the framework of an adaptive picture delay as described above, a new memory control to realise the above advantages.

In video signals, new fields do not necessarily bring new motion information. Sometimes, as in case of film originated picture material, single pictures are transmitted during more than one field. For the purposes of motion estimation and compensation, a knowledge of this situation can be used to significantly improve and/or economise the motion estimation and motion portrayal improvement. As described above, this is realized by circulating the previous picture in the delay element, until the last transmission of the input picture.

However, one limitation of this approach is that, while it provides for a very good motion portrayal improvement, the interlace quality of the output signal is reduced. The need to hold only one original copy of the input in the memory for two or three field periods, means that only one of the two interlace phases is present. That implies that the other phase has to be interpolated for the delayed signal. But in this same specific case of film, de-interlacing does not require interpolation, since the input signal is already a perfectly sequential picture. There is therefore, a sacrifice of the progressive scan quality in order to improve the motion portrayal. This is especially noticeable in slowly moving pictures, where spatial resolution plays more role than dynamic resolution.

This situation can be considerably improved if there is a means of providing, not only a picture with a different "movement phase" in the memory, but also one with an alternating "interlace phase". The object of this further aspect of the invention is to supply not only two different motion phases, but also two different interlace phases to a motion estimator, a motion vector compensated interpolator, or an architectural combination of both.

In order to have at the output, perfect sequential scan data, it must be possible to supply the field memory $FM_{INT}$ also with original information, which is available at the input. There are three ways to do this. One is to use the existing field memories $FM_{ORG}$ and $FM_{INT}$, wherein a data reduction/reconstruction mechanism is applied in such a way that practically both odd and even original fields can coexist in the recursion memory, without any impairment to the motion information. The other possibility is to add an extra field memory $FM_{SWP}$ which is used as a temporary store for one of the interlace phases. The third option not only allows for a perfect sequential scan picture at one input of the motion estimator and up-converter, but also present the other side with sequential scan input, thus even improving the quality of the output the more.

Table 2 illustrates the option with three field memories. The extra field memory $FM_{SWP}$ is used as a temporary buffer to hold the last but one field in the repeat cycle until a write action is possible on the field memory $FM_{INT}$. No data reduction is thus necessary, since at the appropriate instant in time, the field memory $FM_{ORG}$ holds one interlace phase of the film cycle, and the field memory $FM_{INT}$ can then be updated by the other interlace phase which is contained in the extra field memory $FM_{SWP}$. The complete sequential scan picture can thus always be read from the field memories $FM_{ORG}$ and $FM_{INT}$. The control signals w_org and w_int are set to 1 upon receipt of a new movement phase, as shown at input fields B, C, D and E. One field before the control signal w_int is set to 1, the control signal w_SWP is set to 1 in order to preserve the other interlace phase. An embodiment using this field memory control is shown in FIG. 3.

Figure 3:
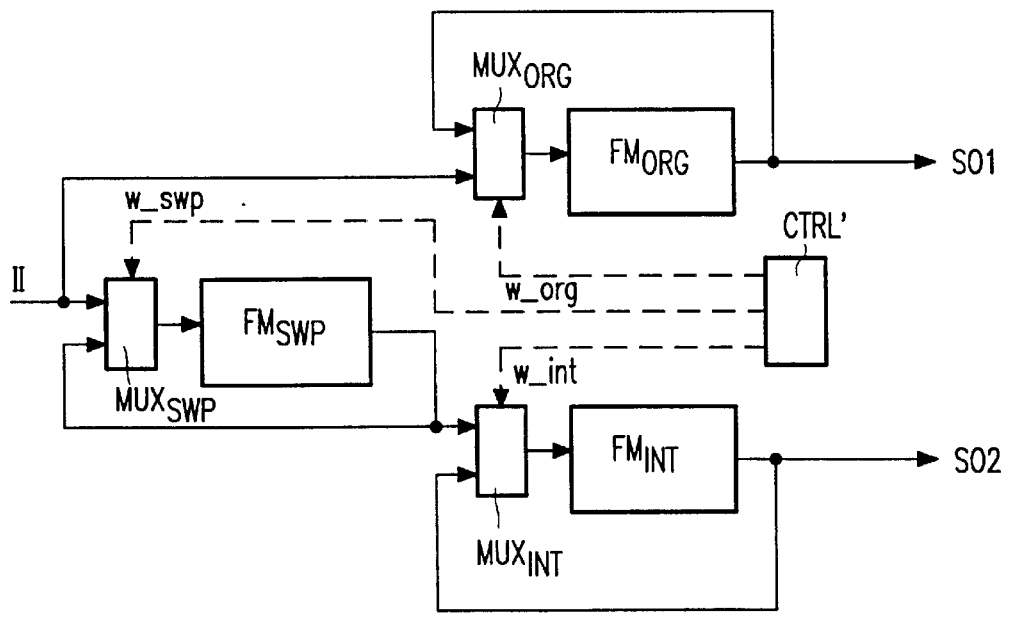
FIG. 3 illustrates a second embodiment of a memory arrangement in accordance with the present invention.

In FIG. 3, an interlaced input signal II is applied to a first input of a multiplexer $MUX_{SWP}$, whose output is applied to its second input thru the field memory $FM_{SWP}$. The multiplexer $MUX_{SWP}$ is controlled by a control signal w_swp from a control unit CTRL'. The interlaced input signal is also applied to a first input of a multiplexer $MUX_{ORG}$, whose output is applied to its second input thru the field memory $FM_{ORG}$. The multiplexer $MUX_{ORG}$ is controlled by a control signal w_org from the control unit CTRL'. An output signal of the field memory $FM_{SWP}$ is applied to a first input of a multiplexer $MUX_{INT}$, whose output is applied to its second input thru the field memory $FM_{INT}$. The multiplexer $MUX_{INT}$ is controlled by a control signal w_int from the control unit CTRL'. The field memory $FM_{ORG}$ supplies the odd lines SO1, and the field memory $FM_{INT}$ supplies the even lines SO2 of the sequential output signal.

Table 3 depicts the necessary control for the two field memory option. Consider the case of 3-2 pull-down film, where one picture is transmitted two or three times before a new one comes. In table 3, fields of the same motion phase are indicated with the same upper case letter, while transmission time difference is indicated by single or double quotes. We notice that even though the motion phase of each transmitted field in the two or three cycle period is the same, the interlace phase is different. Consider the fields A, A', A", B and B' below, for example. Suppose field A is on an odd position, then field A' is even, A' is odd, B is even, and B' is odd. It then means that if we can have access to two consecutive fields within a single movement phase, then we can construct our sequential scan picture, without any need for vertical interpolation. The control of the memories can therefore be modified as shown in the figure, such that the input is written either to the field memory $FM_{ORG}$ or to the field memory $FM_{INT}$, depending on the time instant, and such that both odd and even copies of the original are available in the memories. The case of 2-2 pull-down film is analogous. The corresponding circuit diagram is shown in FIG. 4.

Figure 4:
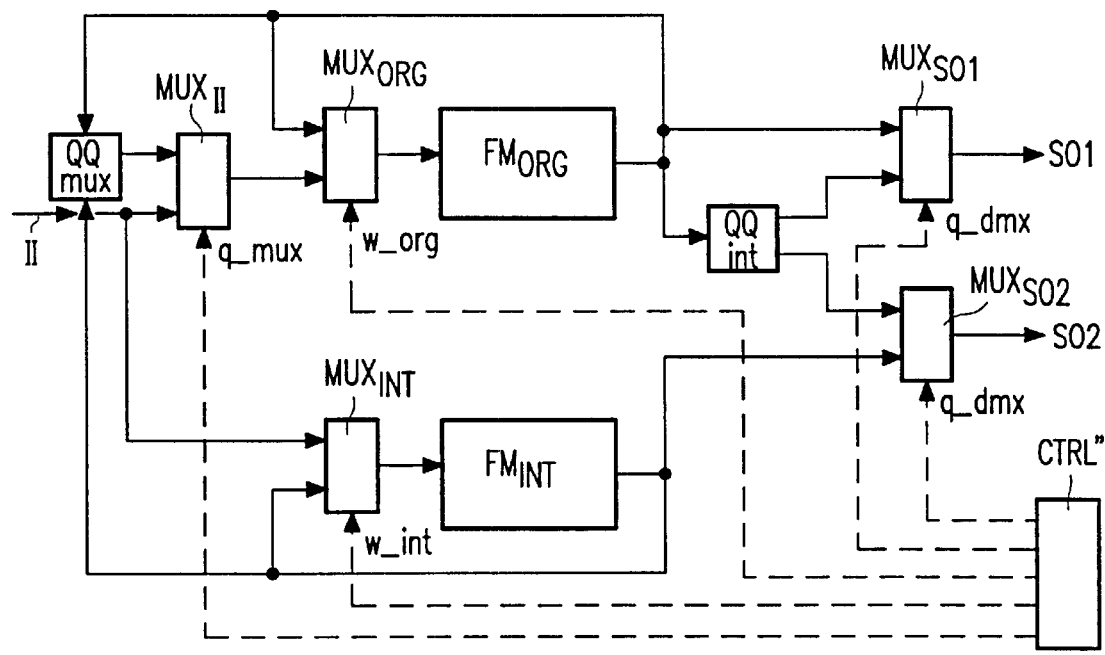
FIG. 4 illustrates a third embodiment of a memory arrangement in accordance with the present invention.

In FIG. 4, an interlaced input signal II is applied to a first input of a multiplexer $MUX_{II}$ (controlled by a control signal q_mux from a control unit CTRL"), whose output is applied to a first input of a multiplexer $MUX_{ORG}$ (controlled by a control signal w_org from the control unit CTRL"). An output of the multiplexer $MUX_{ORG}$ is applied to its second input thru the field memory $FM_{ORG}$. The interlaced input signal II is also applied to a first input of a multiplexer $MUX_{INT}$ (controlled by a control signal w_int from the control unit CTRL"), whose output is applied to its second input thru the field memory $FM_{INT}$. Outputs of the field memories $FM_{ORG}$ and $FM_{INT}$ are applied to a quincunx subsampling and multiplexing circuit QQmux, whose output is applied to a second input of the multiplexer $MUX_{II}$. The output of the field memory $FM_{ORG}$ is also applied to a first input of a multiplexer $MUX_{SO1}$, and to a demultiplexing and quincunx interpolation circuit QQint, whose first output is applied to a second input of the multiplexer $MUX_{SO1}$, and whose second output is connected to a first input of a multiplexer $MUX_{SO2}$. A second input of the multiplexer $MUX_{SO2}$ receives the output signal of the field memory $FM_{INT}$. The multiplexer $MUX_{SO1}$ supplies the odd lines SO1, and the multiplexer $MUX_{SO2}$ supplies the even lines SO2 of the sequential output signal of the memory arrangement of FIG. 4. The multiplexers $MUX_{SO1}$ and $MUX_{SO2}$ are controlled by a control signal q_dmx from the control unit CTRL".

The difference between the method of FIG. 4 and the original memory control of FIG. 2 is that, instead of storing the last transmitted field within a motion phase, we need to store the last but one field as well. This field is written in the field memory $FM_{INT}$. But at this point in time, the previous content of that field memory will be lost. Motion cannot be correctly estimated or compensated using the new content of this memory just after it has been written, because the content belongs to the same motion phase as the input. To solve this problem, the previous content is first combined with that of the field memory $FM_{ORG}$, compressed, and written to the field memory $FM_{ORG}$, before it is replaced by new data. That means the field memory $FM_{ORG}$ provides both odd and even lines in a compressed form, for the time period for which the field memory $FM_{INT}$ may not be read. These are the $A'A''_q$, $BB'_q$, . . . fields. The write-enable signals for the two field memories (w_org, w_int) give the precise time instants when the contents of these memories should be overwritten by the input. The box QQmux combines the information from two lines into at most one line. The box QQmux operates as a quincunx subsampling on each of the input signals of the box QQmux, followed by a multiplex operation on the samples of the respective subsampled signals essentially as carried out in the 20 ms and 80 ms encoder branches of the HD-MAC television system where also two quincunx subsampled lines are combined into one line. A quincunx subsampling filter is used here, but the use of any other data compression algorithm (like preferably, DPCM) is by no means excluded. QQint is the corresponding reconstruction algorithm: a demultiplexing operation and an interpolation of the demultiplexed quincunx subsampled signals essentially as carried out in the 20 ms and 80 ms decoder branches of the HD-MAC television system.

With the construction of FIG. 4, there is always a pair of fields with different movement phases present at the two ends of the frame delay, while both interlace phases are also present for at least one of these fields. The price paid for this added feature is that, for the fields where data reduction is used, the quality of both the motion portrayal improvement and the sequential scan data depends on the fidelity of the compression and reconstruction algorithms. The choice of these algorithms is thus vital. This being guaranteed, the overall quality is improved, since the motion estimator and the compensator can now work with practically perfect sequential scan data.

It is of interest both for motion estimation and temporal interpolation to have a perfect sequential scan picture at both inputs of the estimator and up-converter. With either of the methods described above, this is possible in a limited sense. For 3-2 pull-down film this occurs 40%, and for 2-2 pull-down film 50% of the time. At such time instants we have at the output of one of the field memories, a field within the same movement phase as the input, but with the complementary interlace phase. The addition of yet an extra field memory to the 3 field memory option, or the application of a data reduction at the input will enable us to satisfy this condition all the time.

TABLE 1

FIG. 2 field-memory control

| TIME | 0 | 1 | 2 | 3 | 4 | 5 | 6 | 7 | 8 | 9 | 10 | 11 |
|---|---|---|---|---|---|---|---|---|---|---|---|---|
| 3-2 pull-down film |||||||||||||
| INPUT | A | A' | A" | B | B' | C | C' | C" | D | D' | E | E' |
| $FM_{ORG}$ | Z' | Z' | Z' | A" | A" | B' | B' | B' | C" | C" | D' | D' |
| $FM_{INT}$ | $Z'_f$ | $Z'_f$ | $Z'_f$ | $A"_f$ | $A"_f$ | $B'_f$ | $B'_f$ | $B'_f$ | $C"_f$ | $C"_f$ | $D'_f$ | $D'_f$ |
| w_org | 0 | 0 | 1 | 0 | 1 | 0 | 0 | 1 | 0 | 1 | 0 | 0 |
| w_int | 0 | 0 | 1 | 0 | 1 | 0 | 0 | 1 | 0 | 1 | 0 | 0 |
| 2-2 pull-down film |||||||||||||
| INPUT | A | A | A' | A' | B | B | B' | B' | C | C | C' | C' |
| $FM_{ORG}$ | Z' | Z' | Z' | Z' | A' | A' | A' | A' | B' | B' | B' | B' |
| $FM_{INT}$ | $Z'_f$ | $Z'_f$ | $Z'_f$ | $Z'_f$ | $A'_f$ | $A'_f$ | $A'_f$ | $A'_f$ | $B'_f$ | $B'_f$ | $B'_f$ | $B'_f$ |
| w_org | 0 | 0 | 0 | 1 | 0 | 0 | 0 | 1 | 0 | 0 | 0 | 1 |
| w_int | 0 | 0 | 0 | 1 | 0 | 0 | 0 | 1 | 0 | 0 | 0 | 1 |

TABLE 2

FIG. 3 field-memory control

| TIME | 0 | 1 | 2 | 3 | 4 | 5 | 6 | 7 | 8 | 9 | 10 | 11 |
|---|---|---|---|---|---|---|---|---|---|---|---|---|
| 3-2 pull-down film |||||||||||||
| INPUT | A | A' | A" | B | B' | C | C' | C" | D | D' | E | E' |
| $FM_{ORG}$ | Z' | Z' | Z' | A" | A" | B' | B' | B' | C" | C" | D' | D' |
| $FM_{INT}$ | Z | Z | Z | A' | A' | B | B | B | C' | C' | D | D |
| $FM_{SWP}$ | Z | Z | A' | A' | B | B | B | C' | C' | D | D | D |
| w_org | 0 | 0 | 1 | 0 | 1 | 0 | 0 | 1 | 0 | 1 | 0 | 0 |
| w_int | 0 | 0 | 1 | 0 | 1 | 0 | 0 | 1 | 0 | 1 | 0 | 0 |
| w_swp | 0 | 1 | 0 | 1 | 0 | 0 | 1 | 0 | 1 | 0 | 0 | 1 |
| 2-2 pull-down film |||||||||||||
| INPUT | A | A | A' | A' | B | B | B' | B' | C | C | C' | C' |
| $FM_{ORG}$ | Z' | Z' | Z' | Z' | A' | A' | A' | A' | B' | B' | B' | B' |
| $FM_{INT}$ | Z | Z | Z | Z | A | A | A | A | B | B | B | B |

TABLE 2-continued

FIG. 3 field-memory control

| TIME | 0 | 1 | 2 | 3 | 4 | 5 | 6 | 7 | 8 | 9 | 10 | 11 |
|---|---|---|---|---|---|---|---|---|---|---|---|---|
| $FM_{SWP}$ | Z | Z | A | A | A | A | B | B | B | B | C | C |
| w_org | 0 | 0 | 0 | 1 | 0 | 0 | 0 | 1 | 0 | 0 | 0 | 1 |
| w_int | 0 | 0 | 0 | 1 | 0 | 0 | 0 | 1 | 0 | 0 | 0 | 1 |
| w_swp | 0 | 1 | 0 | 0 | 0 | 1 | 0 | 0 | 0 | 1 | 0 | 0 |

TABLE 3

FIG. 4 field-memory control

| TIME | 0 | 1 | 2 | 3 | 4 | 5 | 6 | 7 | 8 | 9 | 10 | 11 |
|---|---|---|---|---|---|---|---|---|---|---|---|---|
| 3-2 pull-down film | | | | | | | | | | | | |
| INPUT | A | A' | A" | B | B' | C | C' | C" | D | D' | E | E' |
| $FM_{ORG}$ | Z' | Z' | $ZZ'_q$ | A" | $A'A_q"$ | B' | B' | $BB'_q$ | C" | $C'C"_q$ | D' | D' |
| $FM_{INT}$ | Z | Z | A' | A' | B | B | B | C' | C' | D | D | D |
| w_org | 0 | 1 | 1 | 1 | 1 | 0 | 1 | 1 | 1 | 1 | 0 | 1 |
| w_int | 0 | 1 | 0 | 1 | 0 | 0 | 1 | 0 | 1 | 0 | 0 | 1 |
| q_mux | 0 | 1 | 0 | 1 | 0 | 0 | 1 | 0 | 1 | 0 | 0 | 1 |
| q_dmx | 0 | 0 | 1 | 0 | 1 | 0 | 0 | 1 | 0 | 1 | 0 | 0 |
| 2-2 pull-down film | | | | | | | | | | | | |
| INPUT | A | A | A' | A' | B | B | B' | B' | C | C | C' | C' |
| $FM_{ORG}$ | Z' | Z' | $ZZ'_q$ | $ZZ'_q$ | A' | A' | $AA'_q$ | $AA'_q$ | B' | B' | $BB'_q$ | $BB'_q$ |
| $FM_{INT}$ | Z | Z | A | A | A | A | B | B | B | B | C | C |
| w_org | 0 | 1 | 0 | 1 | 0 | 1 | 0 | 1 | 0 | 1 | 0 | 1 |
| w_int | 0 | 1 | 0 | 0 | 0 | 1 | 0 | 0 | 0 | 1 | 0 | 0 |
| q_mux | 0 | 1 | 0 | 0 | 0 | 1 | 0 | 0 | 0 | 1 | 0 | 0 |
| q_dmx | 0 | 0 | 1 | 1 | 0 | 0 | 1 | 1 | 0 | 0 | 1 | 1 |

Figure 5:
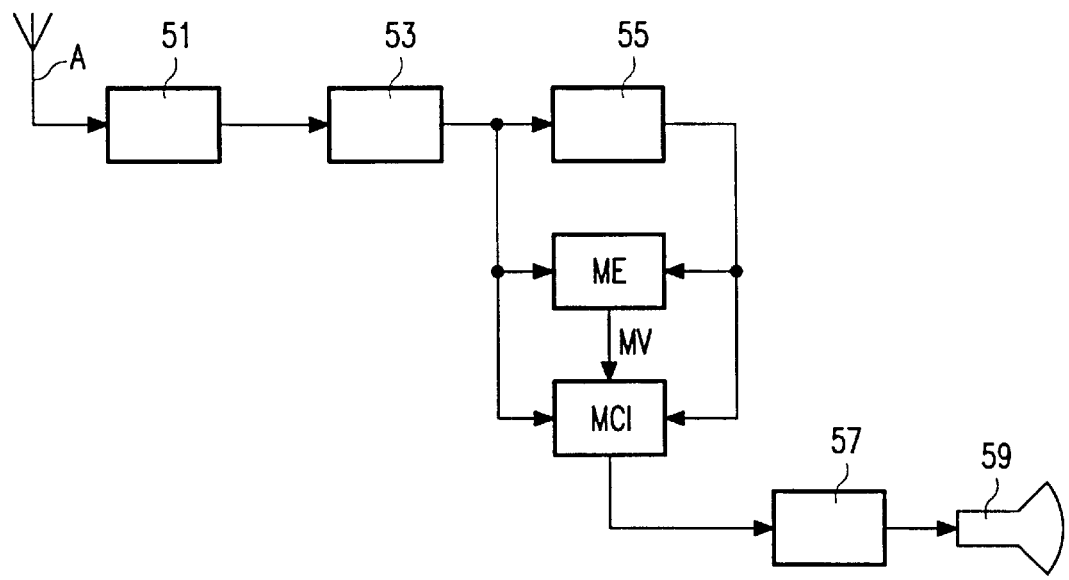
FIG. 5 shows an embodiment of an image processing apparatus in accordance with the present invention.

FIG. 5 shows an embodiment of an image processing apparatus in accordance with the present invention. A television signal is received by an antenna A and applied to a tuner 51 whose output is applied to conventional video signal processing equipment 53. A processed video signal from the equipment 53 is applied to an image information storage arrangement 55 which is controlled in accordance with the present invention. A motion estimator ME obtains motions vectors MV on the basis of the image signals present at the input and at the output of the storage arrangement 55, which are from two different movement phases and preferably also from two different interlace phases. A motion compensation interpolation device MCI furnishes motion vector compensated image information on the basis of the image signals present at the input and the output of the storage arrangement 55, and the motion vectors MV, to an output amplifier unit 57 whose output is coupled to a display device 59. If the image processing apparatus is a television set, the display device 59 is, for example, a CRT or an LCD-screen, while if the image processing apparatus is a PC, the display device 59 is replaced by a video card in the PC.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer.

What is claimed is:

1. A method of storing image information, the method comprising the steps:
receiving said image information; and
storing said image information into a memory device, wherein said method further comprises the step:
controlling said memory device in such a manner that only image information from a movement phase different from the movement phase of the image information already stored in the memory device, is stored into the memory device, whereby said memory device provides image information from a movement phase which differs from a movement phase of said image information by a fixed number of movement phases, even when said image information contains repeated movement phases.

2. The method as claimed in claim 1, wherein said image information contains an indication whether said image information contains repeated movement phases, and said storing step depends on said indication.

3. The method as claimed in claim 1, wherein said method further comprises the step: estimating motion vectors to derive an indication whether said image information contains repeated movement phases, wherein said storing step depends on said indication.

4. The method as claimed in claim 1, wherein said memory device comprises a first field memory and a second field memory, and wherein said storing step comprises the steps:
storing input lines from an interlaced input signal into said first field memory; and
storing interpolated lines into said second field memory.

5. The method as claimed in claim 4, wherein said step of storing interpolated lines comprises the step:
median filtering said input lines, an output signal from said first field memory, and line-delayed input lines from said interlaced input signal, to form said interpolated lines.

6. The method as claimed in claim 1, wherein said image information is stored in compressed form.

7. The method as claimed in claim 1, wherein said memory device comprises a first field memory, a second field memory, and a third field memory coupled to an output of said second field memory, and wherein said storing step comprises the steps:
storing image information into said first field memory and into said third field memory upon receipt of image information from a movement phase different from the movement phase of the image information already stored in the memory device; and storing image information into said second field memory in such a manner that an interlace phase of image information stored in said second field memory differs from an interlace phase of image information stored in said third field memory, whereby, at an input and at outputs of said memory device, image information from two different movement phases and from two different interlace phases is present.

8. The method as claimed in claim 1, wherein said memory device comprises a first field memory and a second field memory, and wherein said storing step comprises the steps:

combining previously stored image information and new image information in compressed form for storage into said first field memory;

splitting and decompressing image information from said first field memory; and storing image information into said second field memory, whereby, at an input and at outputs of said memory device, image information from two different movement phases and from two different interlace phases is present.

9. An arrangement for storing image information, the arrangement comprising:

a memory device for storing said image information; and means for controlling said memory device in such a manner that only image information from a movement phase different from the movement phase of the image information already stored in the memory device, is stored into the memory device, whereby said memory device provides image information from a movement phase which differs from a movement phase of said image information by a fixed number of movement phases, even when said image information contains repeated movement phases.

10. An image processing apparatus, comprising:

an arrangement for storing image information, the arrangement comprising:

a memory device for storing said image information; an means for controlling said memory device in such a manner that only image information from a movement phase different from the movement phase of the image information already stored in the memory device, is stored into the memory device, whereby said memory device provides image information from a movement phase which differs from a movement phase of said image information by a fixed number of movement phases, even when said image information contains repeated movement phases;

means coupled to said arrangement for storing image information for estimating motion vectors;

means coupled to said arrangement for storing image information and to said motion vector estimating means for generating motion vector compensated image information; and means for outputting said motion vector compensated image information.

* * * * *